(12) United States Patent
Mehan et al.

(10) Patent No.: US 6,650,033 B2
(45) Date of Patent: Nov. 18, 2003

(54) FOAMABLE COUPLING FOR LAMP ASSEMBLY AND METHODS FOR USING THE COUPLING

(75) Inventors: Ashok Mehan, Union City, CA (US); Daniel A. Chandler, Menlo Park, CA (US); Erling Hansen, Redwood City, CA (US); Rene J. Revueltas, Menlo Park, CA (US); Stephen P. Tordoff, Redwood City, CA (US); Bryan P. Williams, San Jose, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/923,893

(22) Filed: Aug. 6, 2001

(65) Prior Publication Data

US 2003/0034723 A1 Feb. 20, 2003

(51) Int. Cl.⁷ ............................. H01J 5/48; H01J 5/50; B65B 7/00; B32B 31/14; B32B 5/18
(52) U.S. Cl. ........................ 313/318.08; 313/318.01; 313/318.02; 313/318.09; 313/318.1; 156/69; 156/78
(58) Field of Search .................... 313/318.01, 318.08, 313/318.09, 318.02, 318.1; 220/2.1 R; 156/78, 69

(56) References Cited

U.S. PATENT DOCUMENTS

| 4,018,733 A | 4/1977 | Lopez et al. |
|---|---|---|
| 4,083,902 A | 4/1978 | Clyde |
| 4,145,332 A | 3/1979 | Coxon |
| 4,181,775 A | 1/1980 | Corke |
| 4,332,975 A | 6/1982 | Dienes |
| 4,434,320 A | 2/1984 | Klein et al. |
| 4,456,784 A | 6/1984 | Klein |
| 4,565,944 A | 1/1986 | Beurskens et al. |
| 4,622,488 A | 11/1986 | Beurskens et al. |
| 4,654,473 A | 3/1987 | Roux et al. |
| 4,685,683 A | 8/1987 | Hall et al. |
| 4,687,965 A | 8/1987 | Sanders et al. |
| 4,888,519 A | 12/1989 | Borgis |
| 4,963,698 A | 10/1990 | Chang et al. |
| 4,963,785 A | 10/1990 | Takagi et al. |
| 4,965,410 A | 10/1990 | Spector |
| 4,988,912 A | 1/1991 | Borgis |
| 4,990,821 A | 2/1991 | Blaisdell et al. |
| 5,008,587 A | 4/1991 | Borgis |

(List continued on next page.)

FOREIGN PATENT DOCUMENTS

| DE | 1 589 256 | 2/1970 |
|---|---|---|
| DE | 1 958 307 | 1/1971 |
| FR | 915134 | 10/1946 |
| FR | 2 525 811 A1 | 10/1983 |
| GB | 923402 | 4/1963 |

(List continued on next page.)

OTHER PUBLICATIONS

International Search Report for International Application No. PCT/US02/24570 dated Dec. 30, 2002.

*Primary Examiner*—Vip Patel
*Assistant Examiner*—Matt Hodges

(57) ABSTRACT

A foamable copolymer based coupling is provided for securely affixing a light emitting glass lamp in a metal base to form a lamp assembly. The copolymer is preferably selected from ethylene vinyl acetate, ethylene methyl acrylate, and combinations thereof. The foamable coupling may be placed around one end of the glass lamp or in the lamp base before the lamp and base are matingly engaged. The assembled lamp is then heated to a temperature, which causes the foamable coupling to expand and securely affix the lamp in the base.

14 Claims, 4 Drawing Sheets

U.S. PATENT DOCUMENTS

| | | | |
|---|---|---|---|
| 5,160,465 A | * 11/1992 | Soderberg | 264/46.5 |
| 5,212,208 A | 5/1993 | Soderberg | |
| 5,242,750 A | 9/1993 | Wagner et al. | |
| 5,252,622 A | 10/1993 | DiStefano | 521/65 |
| 5,287,894 A | 2/1994 | Shukushima et al. | |
| 5,312,872 A | 5/1994 | Vestberg et al. | |
| 5,322,972 A | 6/1994 | Fitch et al. | |
| 5,373,027 A | 12/1994 | Hanley et al. | |
| 5,385,951 A | 1/1995 | Soderberg | |
| 5,407,965 A | 4/1995 | Park et al. | |
| 5,772,310 A | 6/1998 | Cserteg et al. | |
| 5,791,927 A | 8/1998 | Iannone | |
| 5,931,474 A | 8/1999 | Chang et al. | |
| 5,979,902 A | 11/1999 | Chang et al. | |
| 6,011,351 A | * 1/2000 | Schemm | 313/493 |
| 6,103,152 A | * 8/2000 | Gehlsen et al. | 264/45.4 |
| 6,107,574 A | 8/2000 | Chang et al. | |
| 6,114,004 A | 9/2000 | Cydzik et al. | |
| 6,118,076 A | 9/2000 | Damm et al. | |
| 6,169,138 B1 | 1/2001 | Petit et al. | |
| 6,398,900 B1 | * 6/2002 | Hieda et al. | 156/245 |

FOREIGN PATENT DOCUMENTS

| | | |
|---|---|---|
| GB | 936481 | 9/1963 |
| GB | 1012108 | 12/1965 |
| GB | 1060297 | 3/1967 |
| GB | 1139266 | 1/1969 |
| JP | 53-135190 | 11/1978 |
| JP | 56 -9931 | 1/1981 |
| JP | 56 -9932 | 1/1981 |
| JP | 59-121764 | 7/1984 |
| JP | 63 -55847 | 3/1988 |
| JP | 3-112034 | 5/1991 |
| JP | 9 -100447 | 4/1997 |
| JP | 10 -40876 | 2/1998 |
| WO | WO 97/47681 | 12/1997 |
| WO | WO 98/28359 | 7/1998 |

* cited by examiner

FOAMABLE COUPLING FOR LAMP ASSEMBLY AND METHODS FOR USING THE COUPLING

FIELD OF THE INVENTION

This invention relates to a foamable coupling comprising an ethylene vinyl acetate (EVA) and/or ethylene methyl acrylate (EMA) base copolymer. In particular, this invention relates to a lamp assembly in which the foamable coupling securely affixes a light emitting glass lamp in a metal base. This invention further relates to methods for securing glass tubes or bulbs in metal bases using the foamable coupling.

BACKGROUND OF THE INVENTION

In the manufacture of lamp assemblies, a light emitting glass lamp such as a fluorescent glass tube or an incandescent glass bulb usually containing wires or filaments is affixed to a metal end cap or base by a thermosetting cement. In order to affix the glass lamp to the metal base, the base is lined with a generous amount of cement, and is then warmed to soften the cement. The base is then placed on one the end of the glass lamp and the cement is heated and cured while the base and glass lamp are securely held together.

Typical cement formulations comprise mixtures of synthetic phenolic resins like novolak and natural resins like shellac and rosin. These binders are used along with fillers, hardeners, solvents, and other reactive components like aldehydes, ammonia, and metal hydroxides for in-situ condensation polymerization. Other cements may contain epoxides, polyesters, alkyds, acrylics, or silicone resins.

These cements, however, have several drawbacks. First, the cements have short shelf lives because of the need for solvents like trioxane or hexamethylenetetramine and other reactive components like aldehydes, ammonia, or metal hydroxides. Second, the use of these organic solvents in the high temperature curing process for these cements creates both health risks and environmental concerns. Third, accurate application of these cements is difficult, and as a result, a relatively large amount of cement must be used to adhere a glass lamp to a metal base. Fourth, because it is very difficult to apply these cements evenly to lamp bases either an insufficient amount of cement is used resulting in inadequate bonding between the glass lamp and the base, or too much cement is used resulting in lamp breakage or impairment of the function of the lamp assembly. Finally, these cements often cannot withstand the high temperatures, which are required during the lamp assembly manufacturing process.

Various attempts to improve the methods for adhering glass lamps in metal bases have been made and some of the compositions and methods for this purpose are described in the prior art. For example, British Patent Specification No. 1,139,266 discloses the use of an insulating foamable hollow cylinder comprising a novolak, hexamethylenetetramine, and dolomite resin to fill the free space in an electric incandescent lamp base in order to prevent arc formation between the current supply conductors or between such conductors and the base. The hollow cylinder is placed in the base, and the incandescent lamp or bulb is then affixed to the base with a conventional thermosetting cement. During the cementing process, the hollow cylinder will foam and fill the free space in the base and prevent formation of arcing between the current supply conductors.

German Patent Application No. 1,958,307 discloses the use of a foamable putty to secure a gas-filled incandescent lamp to a base. The putty or cement is a conventional heat curable putty with a heat foaming additive comprising phenolic resin, hexamethylenetetramine, marble flour, and talc powder. The putty is spread in the upper edge of the lamp base, the lamp is placed in the base, and the base is heated so that the putty foams and fastens the glass lamp to the base.

Japanese Patent Application (Kokai) Nos. 56-9931 and 56-9932 disclose the use of dimer acid based polyamide and polyacrylamide (and its copolymer polyvinyl) based resin cements for use in securing glass tubes or bulbs to bases. While polyamide and polyacrylamide based cements may be more environmentally friendly, they suffer from other disadvantages. These cements are quite expensive, and on prolonged exposure to heat become brittle due to oxidative degradation. Finally, polyamides are also very tacky, and as a result, are difficult to compound into usable compositions.

Japanese Patent Application (Kokai) No. 59-121764 discloses the use of a foamable tape comprising an epoxy or polyester resin and a blowing agent to secure a fluorescent tube or incandescent bulb to a metal base. In order to secure the glass tube or bulb to the base, the foamable tape is wound around the end of the glass bulb, the bulb is placed in a base, and the resulting assembly is heated to 120° C. to foam or expand the adhesive tape. However, it is very difficult to manufacture a tape out of epoxy or polyester thermosetting resins like these, and still maintain control over the tape's dimensions.

Patent Application WO 98/28359 discloses the use of an elastic foamable sealing material, which can be used in lamp housings. The foamable sealing material comprises modified silane polymers, fillers, silica, softeners, and organo-functional low-molecular weight silanes.

U.S. Pat. Nos. 4,988,912 and 4,888,519 disclose using thermoplastic resin rings comprising polyetherimide and polyethersulphone respectively for adhering a lamp vessel, shown as a bulb, to a base. In use, the thermoplastic ring is heated to a temperature of 150–200° C. and placed on the end of a heated lamp vessel. The lamp vessel is then mated with the base, and the base is heated to a temperature of 400–450° C. to melt the ring thereby adhering the lamp vessel and base. The disclosed thermoplastic resin rings are not foamable in nature and suffer from the disadvantage that high heat is required to sufficiently melt the rings to secure the lamp vessel to the base.

In addition, numerous patents disclose the use of EVA based foamable materials for various unrelated applications. For example, U.S. Pat. No. 6,114,004 to Cydzik et al. and U.S. Pat. Nos. 6,107,574, 5,979,902, and 5,931,434 to Chang et al., which are all owned by the assignee of the present application, disclose the use of sealing articles comprising a driver and a sealer in which the driver and sealer are EVA based foamable compositions. The sealing articles are useful in sealing cavities in automobile frame channels and substrates such as electrical conductors and optical fibers. While the foamable compositions of Chang et al. and Cydzik et al. may be able to withstand elevated temperatures for relatively short periods of time, the foam structure in these compositions would collapse on prolonged exposure to elevated temperatures for and extended period of time, such as 140° C. for 2000 hours. Also, the useful time-temperature window for installation of these compositions is very narrow because exposure to high temperatures results in grossly non-uniform cell structure. Furthermore, these foamable compositions would not be able to withstand exposure to commonly encountered hot and humid storage conditions, such as 45° C. at 80% relative humidity for one week.

U.S. Pat. No. 4,456,784 discloses the use of a foamable cylindrical barrier for use in an electrical conduit to prevent the flow of vapor through the conduit. The disclosed foamable cylindrical barrier may comprise an EVA copolymer and a sufficient amount of dicumyl peroxide to cause the barrier to foam.

PCT Patent Application No. WO 97/47681 discloses a reversibly deformable pressure sensitive adhesive foam comprising an EVA copolymer and an expandable particulate material comprising a polymeric shell and a volitizable fluid or gas core. The disclosed pressure sensitive adhesive foam is useful for decorative trim pieces on automotive bodies, appliances, home and office furnishings and equipment. The disclosed foam would not be suitable for use in securing glass lamps to bases, as the underlying technology and normal applications for such foams are entirely different than that of the present invention. As a result, the pressure sensitive adhesive foam is not designed for and would not be capable of withstanding prolonged exposure to elevated temperatures, i.e., 140° C. for 2000 hours, as required by IEC standards.

While the above foamable compositions and methods for securing glass lamps in bases may be suitable for their intended purpose, it is believed that there is demand in the industry for an improved composition for securing light emitting glass lamps in bases, especially one that can be easily and inexpensively prepared, is environmentally friendly, and which can also withstand the elevated temperatures lamp assemblies are required to endure for extended periods of time. It is further believed that there is a demand for an improved composition for securing light emitting glass lamps in bases which is easy to handle and can be used in existing manufacturing process for lamp assemblies.

BRIEF SUMMARY OF THE INVENTION

The present invention provides for an improved foamable coupling used to securely affix a light emitting glass lamp such as a fluorescent tube or incandescent bulb in a metal base to form a lamp assembly. The coupling comprises a base copolymer and at least one blowing agent wherein the copolymer is selected from the group consisting of ethylene vinyl acetate, ethylene methyl acrylate, and mixtures thereof. The coupling may also comprise a chemical crosslinking agent, a radiation crosslinking promoter, a tackifier, an antioxidant, a blowing agent activator, or a filler, or combinations thereof. The present invention further provides an improved method for securely affixing a glass lamp in a base using the foamable coupling. The coupling is placed around one end of the glass lamp or inside the base. The glass lamp is then inserted into the base, and the base is heated to a sufficient temperature for a sufficient time to expand the coupling and securely affix the glass lamp in the base.

DETAILED DESCRIPTION OF THE INVENTION

Figure 1:
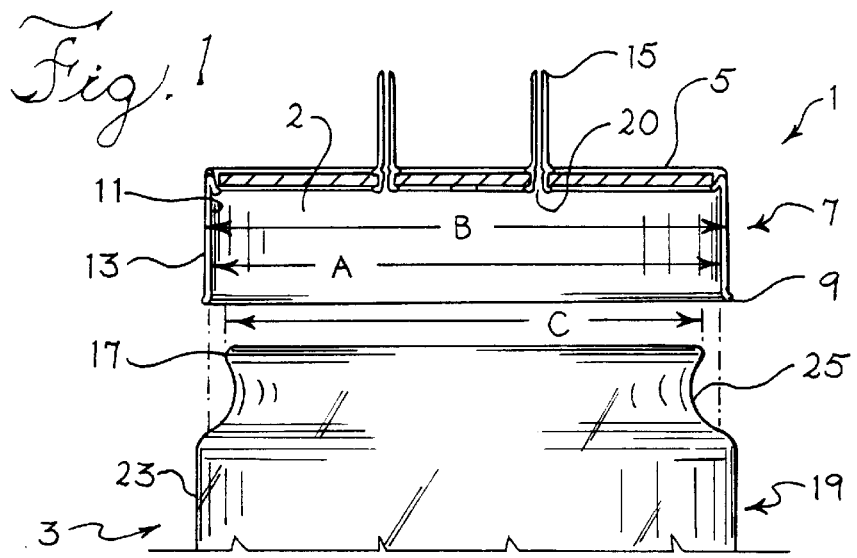
FIG. 1 is a cross-sectional view of a lamp base and a side elevational view of a portion of a fluorescent light emitting glass lamp, which form a lamp assembly.
Figure 11:
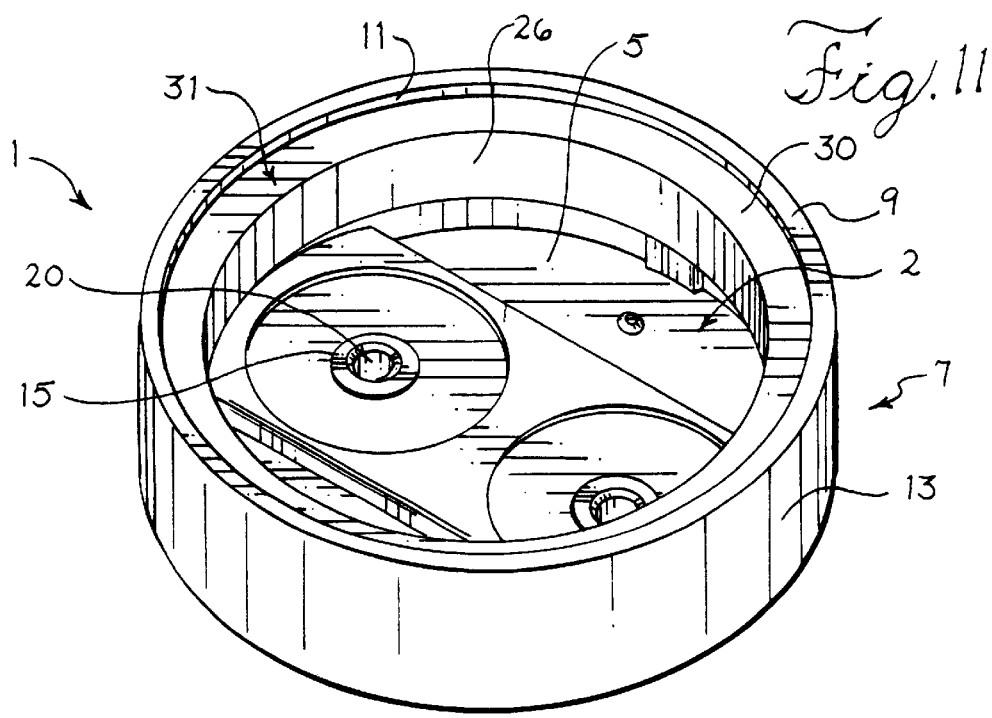
FIG. 11 is a perspective view of the metal base of FIG. 1 with a foamed ring-shaped coupling of the present invention placed inside the base.

Referring now to the Figures, where like numerals denote like elements of the invention, FIG. 1 is a partial cross-sectional view of a generally cylindrically shaped lamp base 1 and a side elevational view of one end of a cylindrically shaped glass lamp 3. The glass lamp and base form the components of a lamp assembly. As shown in FIGS. 1 and 11, the lamp base 1 has a top 5 and a generally cylindrical sidewall 7 terminating at the top 5 and at a lower rim 9. The sidewall 7 of the base 1 further has an interior surface 11 and an exterior surface 13. The top 5 and the sidewall 7 form a cavity 2 for receiving the glass lamp 3. The lamp base 1 further has an inner diameter A and an outer diameter B. Hollow cylindrical electrical contacts 15 extend from and through the bottom 5 of the base 1. The lamp bases are usually formed from steel copper, alloy, brass, stainless steel, aluminum, and the like.

The glass lamp 3 has an open top end 17 and a generally cylindrical side wall 19, which extends to form a closed lower end, which is not shown. The side wall 19 has an interior surface, not shown, and an exterior surface 23. As shown in FIG. 1, a recess 25 extends around the circumference of the glass lamp 3 below the top end 17 of the lamp. The present invention, however, may also be used with glass lamps without such recesses. The top end 17 of the glass lamp 3 has a diameter C which is generally smaller than the inner diameter B of the lamp base 1 such that the top end 17 of the glass lamp fits inside or mates with the base 1 leaving a small annular space between the interior surface of the base and the exterior surface of the glass lamp. The glass lamp 3 also has current carrying wires inside the lamp, not shown, which extend through the open top end 17 and are threaded through openings 20 of the electrical contacts 15.

Figure 2:
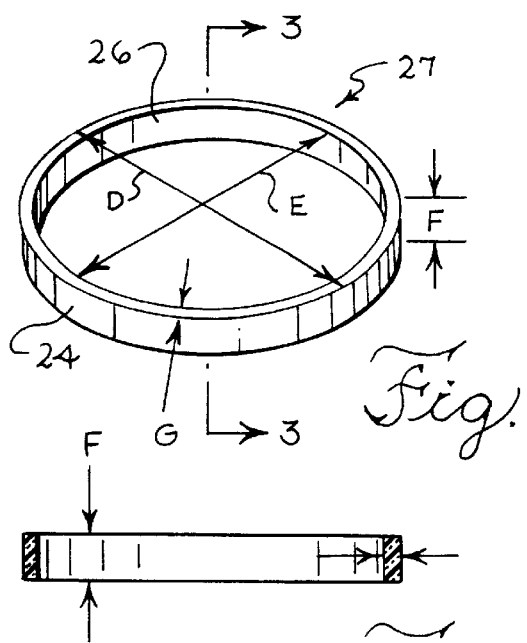
FIG. 2 is a perspective view of a ring-shaped foamable coupling of the present invention.
Figure 4:
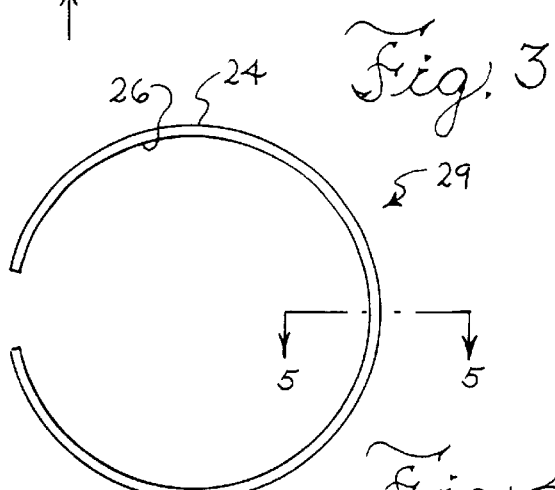
FIG. 4 is a top view of a C-shaped foamable coupling of the present invention.
Figure 3:
FIG. 3 is a cross-sectional view of the ring-shaped foamable coupling of FIG. 2 taken along line 3—3.

FIGS. 2 and 4 illustrate two embodiments of a foamable coupling of the present invention, a ring-shaped coupling 27 and a C-shaped coupling 29, respectively. The ring-shaped coupling 27 has an outer surface 24, an inner surface 26, an outer diameter D, an inner diameter E, a width F, and a thickness G. FIG. 3 is a cross-sectional view of the ring 27 taken along line 3—3. The foamable coupling may also be a rectangular-shaped strip, or comprise a plurality of small rectangular-shaped strips. Preferably the foamable coupling is a single piece ring-shaped or C-shaped coupling as shown in FIGS. 2 and 4. It will be appreciated by those of ordinary skill in the art that the diameter, width, thickness, and shape of the foamable coupling will be directly dependent on the type and size of glass lamps and bases used in the lamp assembly.

Figure 5A:
FIG. 5A is a cross-sectional view of the foamable coupling of FIG. 4 taken along line 5—5.
Figure 5B:
FIG. 5B is a cross-sectional view of the foamable coupling of FIG. 4 taken along line 5—5 with an added adhesive layer.
Figure 6:
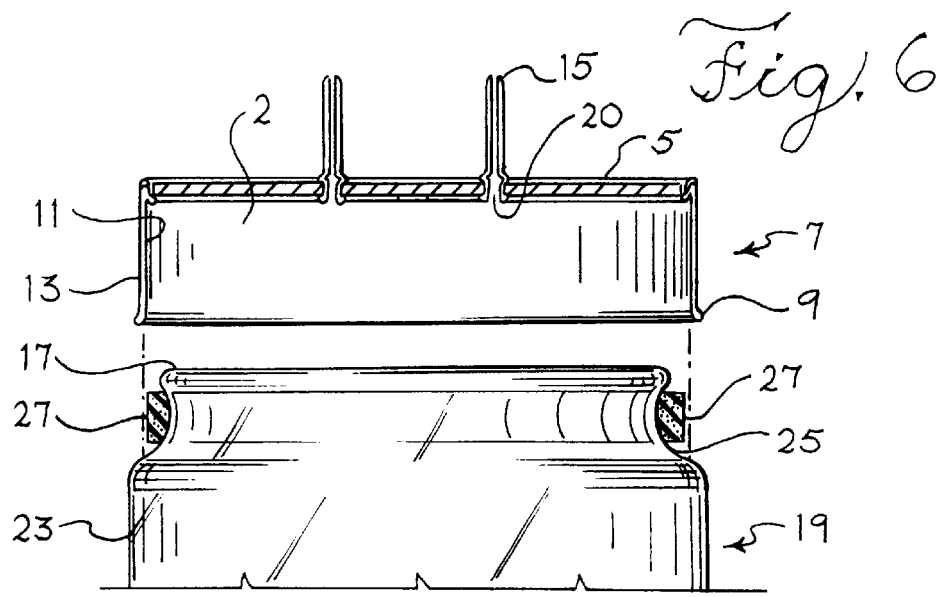
FIG. 6 shows the glass lamp and metal base of FIG. 1 with a cross-sectional view of a ring-shaped foamable coupling placed around the glass lamp.

In a preferred method of the present invention for securing the glass lamp 3 in the base 1, a ring-shaped foamable coupling 27 is placed over the top end 17 of the glass lamp 3 and placed in recess 25 as shown in FIG. 6. The foamable coupling may also be shaped or profiled to fit the contour of recess of the glass lamp. FIG. 5A is a cross-sectional view of the C-shaped foamable coupling 29 of FIG. 4 taken along line 5—5. As shown in FIG. 5A, the C-shaped coupling 29 has a parabolic shape, which is shaped to fit into the recess 25 of the glass lamp 3 of FIG. 1. In another embodiment shown in FIG. 5B, a thin layer of adhesive 22 has been extruded on the inner surface 26 of the C-shaped foamable coupling in order to assist in adhering the foamable coupling 29 in the recess 25 of the glass lamp 3. Alternatively, it will be appreciated by those of ordinary skill in the art that a very thin layer of adhesive may be applied in the recess 25 of the glass lamp to ensure adhesion of the foamable coupling 29 to the glass lamp. The foamable coupling may also include additives to make the coupling more elastomeric in nature so that minimal force is needed to place the ring-shaped coupling over the top of the glass lamp thereby reducing the risk of breaking the glass lamp during the manufacturing process. If the foamable coupling is a rectangular-shaped strip, the coupling is simply wrapped around the recess 25 of the glass lamp. If the foamable coupling comprises a plurality of smaller rectangular-shaped strips, the strips are placed equidistant from one another around the recess 25 of the glass lamp.

Figure 7:
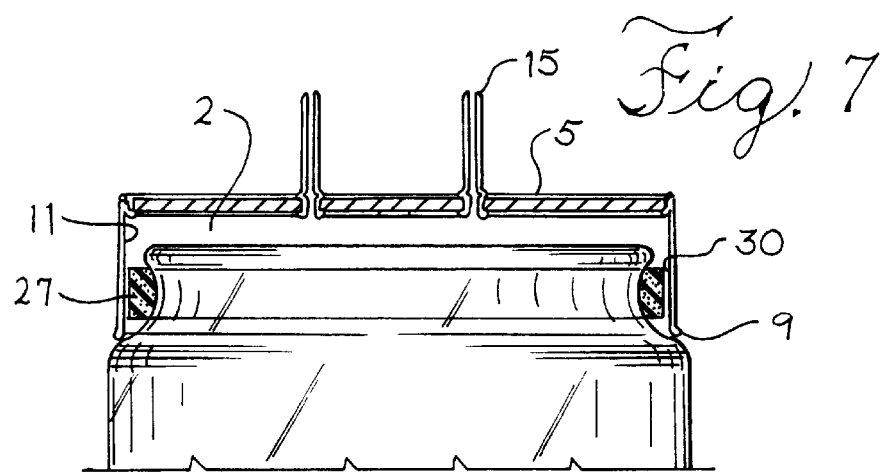
FIG. 7 shows the glass lamp and metal base of FIG. 6 in which the glass lamp has been inserted into the base.
Figure 8:
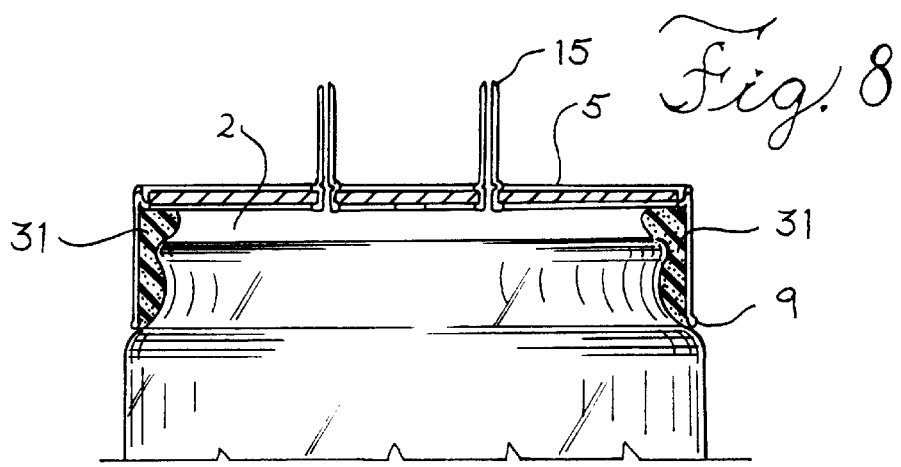
FIG. 8 shows a lamp assembly with the glass lamp secured in a metal base by a coupling of the present invention, which has been foamed and cured.

As further shown in FIG. 7, after the coupling 27 has been placed around the glass lamp in the recess, the top end 17 of the glass lamp 3 is inserted into the base 1 such that there is a small annular space 30 between the ring-shaped foamable coupling 27 and the interior surface 11 of the base. Subsequently, the entire lamp assembly is heated to a temperature, which causes the ring-shaped coupling 27 to foam and cure. During the foaming process, the coupling 27 expands radially and thus does not expand over the rim 9 of the base 1 or onto the electrical contacts 15 in the bottom of the base 1. FIG. 8 shows the foamed and cured ring-shaped coupling 31 filling the annular space 30 and securely affixing the glass lamp 3 in the base 1.

Figure 9:
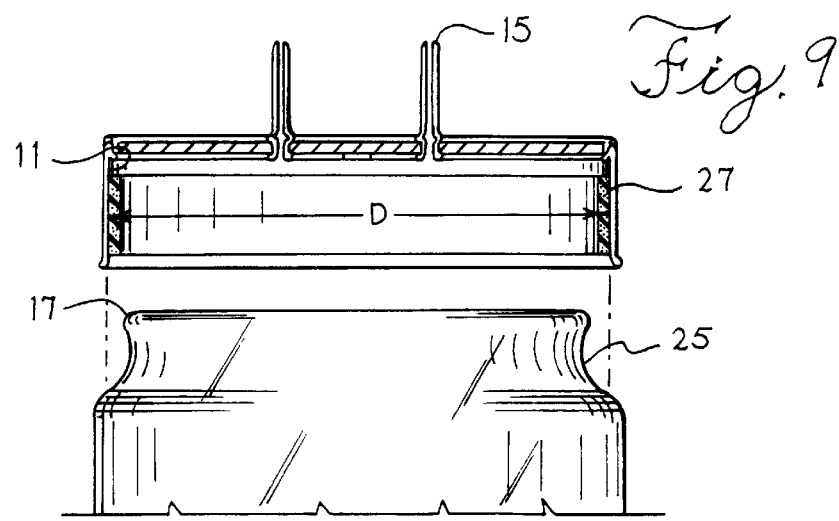
FIG. 9 shows the glass lamp and metal base of FIG. 1 with an unfoamed ring-shaped coupling of the present invention placed in the base.
Figure 10:
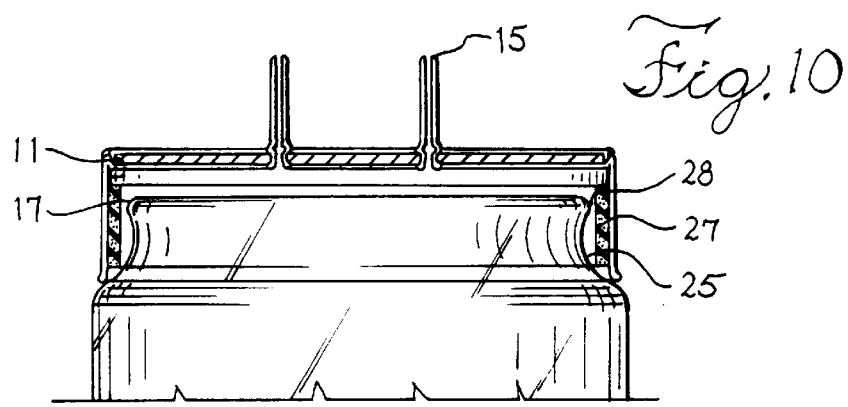
FIG. 10 shows the glass lamp and metal base of FIG. 9 with the glass lamp inserted in the metal base.

Another preferred method for securing a glass lamp in a base is shown in FIGS. 9–11. Referring now to FIG. 9, a ring-shaped foamable coupling 27, or other shaped coupling, is placed in intimate contact with the interior surface 11 of the side wall 7 of the base such that an upper edge 28 of the coupling 27 is only slightly below the rim 9 of the base. The diameter D of the foamable coupling 7 as shown in FIG. 2 is slightly smaller than the diameter A of the base as shown in FIG. 1 in order for the foamable coupling to be inserted into the base 1. However, the diameter D of the coupling 27 cannot be too much smaller than the diameter A of the base or the coupling 27 will not stay in place in the base. One of ordinary skill in the art will appreciate that a small amount of adhesive may be placed on the interior surface 11 of the side wall 7 in order to ensure adhesion of the foamable coupling 27 to the interior surface 11 prior to inserting the glass lamp into the base. Alternatively, adhesive may be extruded onto the outer wall 24 of the foamable coupling 27 to ensure adhesion of the coupling to the interior surface 11 of the side wall.

In order to avoid the use of an additional adhesive and to provide for easier insertion of the foamable coupling 27 into the base 1, the coupling may be oriented to have a recoverable diameter. Such an extruded foamable coupling 27 is placed in the base 1 and heated to a temperature which causes the coupling to recover in diameter to fit tightly into the base 1, but which does not cause foaming and curing of the coupling 27.

After insertion of the foamable coupling 27 in the base 1, the glass lamp 3 is inserted into the base as shown in FIG. 10. Subsequently, the entire light bulb assembly is heated to a temperature, which causes the ring-shaped coupling to foam and cure. FIG. 8 again shows the foamed and cured coupling 31 securely affixing the glass lamp 3 in the base 1.

FIG. 11 is a top perspective view of a lamp base 1 with a foamed ring-shaped coupling 31 affixed to the interior surface 11 of sidewall 7. As shown in FIG. 9, during the foaming process, the coupling 31 expands radially and thus the upper edge 28 of the foamed coupling 31 does not expand over the rim 9 of the base 1 or onto the electrical contacts 15 in the bottom of the base 1.

Suitable compositions for the foamable coupling of the present invention will be EVA or EMA based copolymer compositions having foaming temperatures in the range of the intended application and which can withstand prolonged use at elevated temperatures. In general, the foamable composition will contain an EVA and/or EMA base copolymer and a blowing agent for foaming the base copolymer. In addition, the foamable composition may include antioxidants, chemical crosslinking agents, radiation crosslinking promoters, tackifiers, fillers, flame retardants, and the like.

A single EVA or EMA copolymer, a blend of different EVA copolymers, or a blend of EVA and EMA copolymers may be used to form the base polymer for the foamable composition. EVA refers to a random copolymer of polyethylene with vinyl acetate, while EMA refers to a random copolymer of ethylene and an ester type acrylic derivative. The acrylic derivative may be based on methyl acrylate (-MA) or ethyl acrylate (-EA) or butyl acrylate (-BA). Furthermore one may employ methacrylic acid, instead of esters of acrylic acids for improved adhesion and/or increased stiffness in the coupling composition. Along the same lines, one may choose to employ functionalized derivatives of these copolymers, which perform similarly to the parent polymer itself. Typical functional groups or terpolymers for enhanced bond strength may be a maleic anhydride or an acrylic acid. Similarly one may use a terpolymer wherein the additional group may be a maleic anhydride or an acrylic acid.

Numerous EVA and EMA based copolymers are commercially available. Preferred EVA copolymers include Escorene® LD-761 manufactured by Exxon, Elvax® 460 manufactured by Dupont, and Evatane® 2805 manufactured by ELF Atochem, Inc. The vinyl acetate concentration of the EVA copolymers is preferably about 9–33%, more preferably about 18–30%, and most preferably about 25–29%. The melt index of the EVA copolymers is preferably between 0.5 and 150 and more preferably between 1 and 10. Preferred EMA copolymers are Optema® TC 120 manufactured by ExxonMobil Chemical Company, Lotryl® EMA Grade 24MA005 manufactured by Atofina Chemicals, and Emac® manufactured by Chevron Chemical Company. The methyl acrylate content of the EMA copolymer is preferably about 9–33%, more preferably about 16–30% and most preferably about 20–30%. The melt index of the chosen EMA copolymer is preferably between 0.25 and 45 and more preferably between 0.5 and 5.

Blowing agents are chosen to effect foaming and expansion of the foamable composition at an activation temperature from 120° C. and 200° C. Suitable blowing agents will include azodicarbonamide and benzenesulfonyl hydrazide. Suitable azodicarbonamide blowing agents include Celogen® AZ 130 or 3990, and modified azodicarbonamide agents include Celogen® 754 or 765 all from Uniroyal Chemical. Suitable bezenesulfonyl hydrazide blowing agents include p,p'oxybis(bezenesulfonyl hydrazide), sold as Celogen® OT, and p-toulene-sulfonyl hydrazide, sold as Celogen TSH, both also from Uniroyal Chemical. The blowing agent may also be a combination of agents depending on the degree of expansion desired for the particular application. Certain fillers, such as zinc oxide (Kadox 911 manufactured by Marman/Keystone Industries), may also act as activators for the blowing agent and aid in the required expansion. The amount of activator added will depend on the choice of blowing agent and the amount of expansion required.

Another type of blowing agent particularly useful in the present invention is a microencapsulated blowing agent. Such blowing agents generally comprise a spherical polymeric shell and a gas or a liquid blowing agent within the shell. When the polymeric shell is heated, the shell softens and the gas or fluid within the shell increases in pressure causing the shell to expand. When the heat source is removed, the polymeric shell hardens and remains in its expanded state. The expansion function of such microencapsulated blowing agents may also be increased by the addition of one or more of the conventional blowing agents previously discussed.

The polymeric shell generally comprises copolymers of vinyl chloride, vinylidene chloride, acrylonitrile, methacrylonitrile, styrene, and combinations thereof. Preferably, the polymeric shell encapsulates a hydrocarbon-based gas such as isopentane or isobutane. With respect to the present invention, the unexpanded polymer shells preferably have a size ranging from about 3 $\mu$m to 60 $\mu$m, more preferably from about 10 $\mu$m to 40 $\mu$m, and most preferably from about 15 $\mu$m to 30 $\mu$m.

Preferred encapsulated blowing agents include Expancel® polymeric microspheres manufactured by Akzo Nobel. In general, such microspheres have an unexpanded diameter between 6 $\mu$m and 40 $\mu$m and an expanded diameter between 20 $\mu$m and 150 $\mu$m. More preferably, the encapsulated blowing agent is Expancel® 091-DU-80, and most preferably Expancel® 092-DU-120 both of which have polymeric shells comprising copolymers of acrylonitrile and methacrylonitrile and encapsulate isopentane gas.

The chemical crosslinking agent is preferably a free radical crosslinking agent compatible with the EVA or EMA base polymer. Preferred chemical crosslinking agents are peroxides such as bis(t-butylperoxy)diisopropylbenzene, di-(2-t-butyl peroxyisopropyl benzene) (Vulcup 40KE), 1,1-d-t-butylperoxy-3,3,5-trimethylcyclohexane, 4,4-di-t-butylperoxy n-butyl valerate (Trigonox), and dicumyl peroxide (Dicup). A preferred chemical crosslinking agent is with Vulcup 40 KE manufactured by Hercules Industries Inc.

The blowing agent and the chemical crosslinking agent will be chosen so that the chemical crosslinking agent has an activation temperature approximately the same as the blowing agent. For example, the chemical crosslinking agent may have an activation temperature slightly above or below that of the blowing agent, so that the foam maintains stability during expansion. Desirably, the activation temperature of the blowing agent will be chosen so that the blowing agent is not easily accidentally activated but is only activated when it encounters temperatures in which it is desired that the foamable composition be activated.

In a preferred embodiment, a radiation crosslinking promoter is used in addition to the chemical crosslinking agent. While those of ordinary skill in the art would normally consider the use of a radiation crosslinking promoter in addition to a chemical crosslinking agent redundant and unnecessary, the addition of a radiation crosslinking promoter yielded surprising results. Foamable compositions of the present invention incorporating both a chemical crosslinking agent and a radiation crosslinking promoter exhibited increased stability of the foamed compositions at high temperatures. The radiation crosslinking promoter may be chosen from among those conventionally used to promote crosslinking of polymers, including triallyl cynurate (TAC), triallyl isocyanurate (TAIC), triallyl trimellitate, triallyl trimesate, tetrallyl pyromellitate, the dually ester of 1,1,3,-trimethyl-5-carboxy-3-(4-carboxyphenyl)indene, trimethylolpropane trimellitate (TMPTM), pentaerythritol trimethacrylate, tri(2-acryloxyethyl)isocyanurate, tri(2-methacryloxyethyl)trimellitate, and the like and combinations thereof. A preferred radiation crosslinking promoter is TMPTM commercially available as Sartomer SR 350 from Sartomer Company.

The tackifier will be chosen to enhance the tackiness of the foamable compositions on activation but not such that the composition will exhibit tackiness prior to or after activation, or after cooling and solidification. Desirably, the tackifier will have a relatively low molecular weight, no significant crystallinity, a ring and ball softening point above at least 50° C. and will be compatible with the EVA or EMA base polymer. Suitable tackifiers include novolak resins, partially polymerized rosins, tall oil rosin esters, low molecular weight aromatic thermoplastic resins, Picco® and Piccotac® resins from Hercules Chemical Company. A preferred tackifier is Piccotac® 95. In addition, some functionalized aliphatic polyamide hot melt resins made by Henkel Adhesives or Arizona Chemicals may also be used to improve the hot tack properties of the coupling and ultimately the bond strength between the glass lamp and metal base. A preferred polyamide hot melt resin is Macromelt® 6239 from Henkel Adhesives and is preferably added to the foamable composition in an amount of 5 to 50% by weight, and more preferably 10 to 15% by weight.

Suitable fillers for the composition include, zinc oxide, barium sulfate (Huberite), calcium carbonate, magnesium hydroxide, carbon black, and the like. A preferred carbon black is Raven C Ultra Beads manufactured by Columbian Chemicals Company. Ferromagnetic particles, including iron powder, nickel flakes and the like, may also be added for inductive heating, foaming and curing of the composition.

Flame retardants may also be added in an amount as will provide flame retardancy for the foamable ring. Suitable flame retardants include polybrominated aromatics, such as decabromobiphenyl, and the like in combination with inorganic materials such as antimony trioxide. Antioxidants, foaming agents, adhesion promoters, UV screeners, plasticizers, pigments and the like may also be employed in conventional amounts.

Exemplary formulations for the foamable composition using a conventional azodicabonamide and benzenesulfonyl hydrazide blowing agents are listed below in Table I with A1 being preferred, A2 being more preferred, and A3 being the most preferred formulation.

TABLE I

| Ingredient | Formulations By Weight Percent | | |
|---|---|---|---|
| | A1 | A2 | A3 |
| EVA/EMA Copolymer | 50–80 | 60–80 | 78.5[a] |
| Tackifier | 0–30 | 3–15 | 5[b] |
| Antioxidant | 0.25–5 | 0.5–4 | 3[c] |
| Chemical Crosslinking Agent | 0.5–5 | 1–4 | 3[d] |
| Blowing Agent | 1–10 | 2–7 | 3[e] |
| Blowing Agent Activator | 0–10 | 1–7 | 2.5[f] |
| Radiation Crosslinking Promoter | 0.5–5 | 1–4 | 2.5[g] |
| Fillers | 0–30 | 0–20 | 2.5[h] |

[a]ATEVA 2803
[b]Piccotac ® 95
[c]2% Irganox 1010, 1% Cyanox 1212
[d]Vulcup 40KE
[e]Celogen ® OT-72DG
[f]Kadox 911
[g]Sartomer SR 350
[h]Carbon Black Raven C Ultra Beads In order to achieve optimal performance of the blowing agents and the required level of foaming and curing, the foamable compositions in Table I should be heated to a temperature from 130 to 200° C., more preferably 150 to 180° C., and most preferably to 165° C.

Exemplary formulations for the foamable composition using a microencapsulated blowing agent are listed below in Table II with B1 being preferred, B2 being more preferred, and B3 being the most preferred formulation.

TABLE II

| Ingredient | Formulation By Weight Percent | | |
|---|---|---|---|
| | B1 | B2 | B3 |
| EVA/EMA Copolymer | 50–80 | 60–80 | 74[a] |
| Tackifier | 0–30 | 3–15 | 5[b] |
| Antioxidant | 0.25–5 | 0.5–4 | 3[c] |
| Microencapsulated Blowing Agent | 1–10 | 1–7 | 5[d] |
| Chemical Crosslinking Agent | 0.5–5 | 1–4 | 3[e] |
| Chemical Blowing Agent | 0–5 | 0–3 | 0 |
| Blowing Agent Activator | 0–10 | 0–6 | 4[f] |
| Radiation Crosslinking Promoter | 0.5–5 | 1–4 | 2.5[g] |
| Fillers | 0–30 | 0–20 | 2.5[h] |

[a]Escorene ® LD 761
[b]Piccotac ® 95
[c]2% Irganox 1010, 1% Cyanox 1212
[d]Expancel ® 092-DU-120
[e]Vulcup 40KE
[f]Kadox 911
[g]Sartomer SR 350
[h]Carbon Black Raven C Ultra Beads In order to achieve optimal performance of the blowing agents and the required level of foaming and curing, the foamable compositions in Table II should be heated to a temperature from 130 to 200° C., more preferably 150 to 190° C., and most preferably to 160° C.

The foamable compositions of the present invention may be prepared by known conventional methods in the art of polymer blending, such as mixing in a high shear Banbury or Brabender type mixer. In a commonly used method involving high shear compounding of peroxide laden formulations, the compositions are formed in Banbury mixer using a one or two pass (batch) process, with the one pass process being preferred.

In the two pass process, the Banbury mixer is generally not heated, the motor is placed in high gear for high rotation speeds and the ram is set at about 100 psi. Initially, all of the ingredients except the peroxide and the blowing agent(s) are mixed in the Banbury. In particular, during the first pass, all of the ingredients except the tackifier and radiation crosslinking promoter are blended in the Banbury for approximately 1.0–1.5 minutes with the ram in the down position. The tackifier and radiation crosslinking promoter are subsequently added, and the batch is thoroughly blended for 1.5–3.0 minutes with the ram in the neutral position. The batch is further blended for an addition 0.5–1.0 minutes with the ram in the up position. The temperature of the resulting "first pass" batch as its exits the Banbury is approximately 120 to 130° C. The "first pass" batch is then processed through a pelletizing extruder operating at low rpm with barrel temperature settings of about 80–90° C., with the pelletizing die temperature being approximately 90–110° C.

During the "second pass," the "first pass" pellets and the peroxide and blowing agent(s) are placed in the unheated Banbury having operating conditions as set forth above. The "second pass" batch is blended for 0.8–0.9 minutes with the ram in the down position and then for 0.2–1.1 minutes with the ram in the neutral position. Special attention must be paid to the overall operating conditions during the "second pass" to ensure that temperature of the batch does not reach or exceed the activation temperature of the peroxide and blowing agent(s). For the most preferred compositions described above, the temperature of the composition during the "second pass" preferably does not exceed about 110° C., and more preferably does not exceed 105° C. The temperature of the resulting "second pass" batch as it exits the Banbury is most preferably approximately 95–105° C. The "second pass" batch is then processed through a pelletizing extruder at the same operating conditions set forth above producing the final composition pellets.

In the preferred one batch process using a Model F-80 Banbury mixer, the polymers, carbon black, and any other fillers are first added to the Banbury mixer with the rotors set at 60 rpm and are mixed to a flux for about 1.5 minutes. Low viscosity materials including the tackifier and other liquid ingredients are then added into the existing mixture and mixed for another 2.0 minutes with the rotor speed dropped to 25 rpm. Finally, the thermally sensitive materials such as the blowing agent and the crosslinking agent are added into the composition and mixed for another 1.5 minutes before being extruded into the final composition pellets. The temperature of the foamable composition as it passes into the extruder is about 100° C. with the extruder operating at the same conditions set forth above. Those of ordinary skill in the art of compounding heat sensitive materials will recognize the need to adjust machine parameters to the needs of the formulation, depending upon the melting point and viscosity of the base resin, filler content and the activation temperature of the peroxide and the blowing agents used.

The final composition pellets may then be extruded, compression molded, or injection molded into foamable couplings for use in securing glass lamps to bases. Preferably, the final composition pellets are processed through an extruder. During the extrusion process, care must be taken to avoid generating too much shear heat in the extruder barrel and to maintain the exit melt temperature of the composition well under the activation temperatures of both the blowing agent(s) and the peroxide. In particular, the temperature of the composition during the extrusion process should not exceed about 105° C.

The final composition pellets may be extruded into ring-shaped, C-shaped, or rectangular-shaped foamable couplings, which are ready to be used in a lamp assembly as previously discussed. Alternatively, the final composition pellets may be extruded into sheets, and ring-shaped, C-shaped or rectangular-shaped foamable couplings may be cut out of the sheets. Preferably, the final composition pellets are extruded into ring-shaped or C-shaped foamable couplings. After they have been extruded, the couplings may be physically crosslinked with gamma radiation or a high energy electron beam to improve heat resistance.

Upon testing of the foamable compositions in Table I and Table II, it was found that the use of higher concentrations of Expancel® 092-DU-120 without a traditional blowing agent had dramatic and unexpected results. The shelf life of the unfoamed composition was much longer than expected, as indicated by comparative expansion characteristics of materials stored at 45° C. and 80% relative humidity. In addition, the rigidity of the foamed composition, was surprisingly much higher than expected, when compared against foams obtained with traditional chemical blowing agents as indicated by secant modulii values of the two foamed compositions at equivalent voids content. The use of this microencapsulated blowing agent composition also resulted in a large increase in the torque required to dislodge the base from the glass. The use of Expancel® 092-DU-120 further assisted in maintaining the integrity of the cell structure of the composition after foaming when subjected to elevated temperatures (140° C.) for a substantial period of time (3500 hours).

Accelerated Aging Tests

Test samples of compositions B2 and B3 set forth in Tables III and IV below were prepared according to the two batch process described above.

TABLE III

Formula B2 (based on Formula B2 from TABLE II)

| Ingredients | Weight Percent (% W/W) |
|---|---|
| ATEVA 2803 | 74.00% |
| Piccotac ® 95 | 5.00% |
| Vulcup 40 KE | 3.00% |
| Celogen ® OT-72DG | 5.00% |
| Kadox 911 | 4.00% |
| Irganox 1010 | 2.00% |
| Cyanox 1212 | 1.00% |
| Sartomer SR 350 | 2.50% |
| Raven C Ultra Beads | 2.50% |
| Expancel ® 91-DU | 1.00% |
| Total | 100.00% |

TABLE IV

Formula B3 (from TABLE II)

| Ingredients | Weight Percent (% W/W) |
|---|---|
| Evatane ® 28-05 | 74.00% |
| Piccotac ® 95 | 5.00% |
| Vulcup 40 KE | 3.00% |
| Kadox 911 | 4.00% |
| Irganox 1010 | 2.00% |

TABLE IV-continued

Formula B3 (from TABLE II)

| Ingredients | Weight Percent (% W/W) |
|---|---|
| Cyanox 1212 | 1.00% |
| Sartomer SR 350 | 2.50% |
| Raven C Ultra Beads | 2.50% |
| Expancel ® 092-DU-12- | 6.00% |
| Total | 100.00% |

The final B2 and B3 composition pellets were separately placed into a 6×6×0.040 inch mold sandwiched between two Teflon sheets and steel back plates. This mold assembly was then placed in the platens of a hydraulic hot press heated to 100° C. The mold assembly was preheated to approximately 60 seconds under a load of 1000 psi. The pressure on the mold assembly was then increased to 30,000 psi then released to zero psi three times. This allowed any air in the mold assembly to be expelled. The pressure was then increased to 30,000 psi for 2 minutes. The pressure on the mold assembly was then released, and the mold was placed into a cold press where the pressure was increased to 30,000 psi and held for 1 minute in order to cool the mold assembly. The pressure on the mold assembly was released, and the mold was released from the assembly. The 6×6×0.040 inch molded plaque of material was removed from the mold and any excess flashing was trimmed from the plaque.

Test strips 0.25 inches in width, 0.40 inches thick and 6 inches long were die cut from the molded plaques. The test strips were place on Teflon coated cookie sheets and aged in air circulating ovens preheated to 140° C. and 160° C. Periodically specimens of both materials were removed from the oven for elongation testing. Specimens were allowed to cool to room temperature prior to testing. All testing was carried out on an INSTRON® tensile testing machine at a crosshead speed of 50 mm/min. Results of the elongation testing are shown in Tables V and VI below.

TABLE V

| Sample | Elongation |
|---|---|
| Formula B2 | |
| Expanded 160° C. for 15 Minutes | |
| 1 | 400% |
| 2 | 300% |
| 3 | 420% |
| Average | 413% |
| Expanded Aged for 2600 hrs. @ 140° C. | |
| 1 | 240% |
| 2 | 210% |
| 3 | 200% |
| Average | 217% |
| Expanded Aged for 3500 hrs. @ 140° C. | |
| 1 | 80% |
| 2 | 30% |
| 3 | 50% |
| Average | 53% |

TABLE VI

| Sample | Elongation |
|---|---|
| Formula B3 | |
| Expanded 160° C. for 15 Minutes | |
| 1 | 100% |
| 2 | 140% |
| 3 | 120% |
| Average | 120% |
| Expanded Aged for 2600 hrs. @ 140° C. | |
| 1 | 220% |
| 2 | 210% |
| 3 | 210% |
| Average | 213% |
| Expanded Aged for 3500 hrs. @ 140° C. | |
| 1 | 120% |
| 2 | 140% |
| 3 | 120% |
| Average | 127% |

As shown in the Tables V and VI, both B2 and B3 have sufficient elongation retention after 2600 hours of aging at 140° C. to withstand the IEC requirements for lamp assemblies of 2000 hours at 140° C. However, the superior improved thermal aging stability of the B3 test strips aged at 140° C. for 3500 hours was unexpected.

Bonding Performance Tests

The bonding performance of formulations A3 from Table 1, and B2 and B3 from Tables III and IV were also tested. The formulations were made by the two-batch process set forth above. The final pellets for each formulation were then extruded into a tubular shape having a wall thickness of 0.036 inches. Subsequently, ring-shaped couplings having a cut length (height) of 0.1000±0.010 inches were cut from the extruded tubing. The ring-shaped couplings were then each placed in the metal base of a size T12 fluorescent lamp assembly provided by Osram/Sylvania. The metal bases were then placed onto the glass lamp of the T12 lamp assembly. These resulting assemblies were placed into a forced air oven at the temperatures and for the times listed below in Table VII in order to securely affix the glass lamp into the metal lamp base. The samples were then removed from the oven and cooled for at least 20 minutes before any testing was done. The lamp assemblies were then placed one at a time in a torque-testing fixture with a force gauge, and the torque (inch/lb) required to rotate the metal lamp base more than 3° or break the metal base completely free from the glass lamp was measured. The results of these torque tests are set forth in Table VII.

TABLE VII

| Formula | Temperature (° C.) | Time (sec.) | Torque (in/lbs) |
|---|---|---|---|
| A3 | 200 | 90 | 4 |
| B2 | 200 | 90 | 26 |
| B3 | 200 | 90 | 31 |
| B2 | 200 | 120 | 9 |
| B3 | 200 | 120 | 14 |
| B2 | 325 | 60 | 10 |
| B2 | 325 | 60 | 12 |
| B3 | 325 | 60 | 15 |
| B3 | 325 | 60 | 20 |

As shown in Table VII, the B3 couplings had better bonding strength than B2 couplings, which again was unexpected.

Shelf Life Tests

Tests were also performed on B2 and B3 compositions to determine the shelf life of the compositions or the amount of time the compositions can be stored before comprising performance of the compositions. The samples used in the shelf life tests were prepared using an 8×8×0.040 inch compression mold with nine 1-inch diameter holes cut out of the mold. The mold was placed on a Teflon® sheet backed by a steel plate. A measured amount of the compositions was distributed within the 1-inch diameter holes of the mold and another Teflon® sheet with a steel back plate was placed on top of the mold to complete the mold assembly. The mold assembly was then subjected to the same process set forth with respect to the Accelerated Aging Tests. The 1-inch round compression molded disks formed from B2 and B3 were each divided into two groups. The first group was labeled as a "Control" and was placed into individual zip lock bags. The zip lock bags were stored at room temperature, approximately 19° C. The second group of disks was labeled as "Shelf Life Study" and was placed into a humidity chamber set to a temperature of 45° C. with a relative humidity setting of 80%.

The unexpanded B2 and B3 "Shelf Life Study" disks were removed from the humidity chamber after exposure to the hot and humid environment for three, six, and twelve weeks. Each time the B2 and B3 Shelf Life Disks were removed from the humidity chamber, they were compared to the unexpanded "Control" disks. Subsequently both the B2 and B3 "Shelf Life Study" and "Control" disks were placed into a baking pan containing compacted PTFE powder. The pan was then placed in an air-circulating oven pre-heated to a temperature of 180° C. for 20 minutes allowing the disks to fully expand. After the expansion process, the "Control" disks and the "Shelf Life Study" disks were removed from the oven and allowed to cool at room temperature. The expanded "Control" disks were then carefully compared to the expanded "Shelf Life Study" disks.

Figure 12:
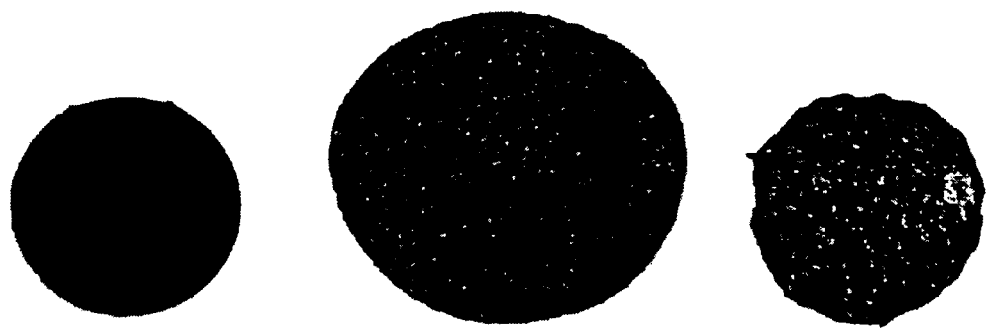
FIG. 12 is a photograph of test disks made in accordance with the foamable compositions of the present invention.
Figure 13:
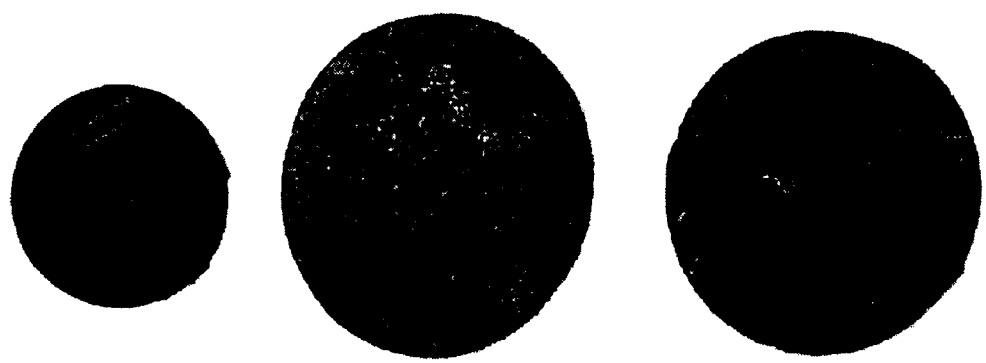
FIG. 13 is a photograph of test disks made in accordance with the foamable compositions of the present invention.

FIG. 12 is photograph of three disks, 12A, 12B, and 12C used in the study made in accordance with formula B2. Disk 12A is an unexpanded "Control" disk. Disk 12B is a "Control" disk that was stored at room temperature for 6 weeks and then foamed and cured as set forth above. Disk 12C was subjected to 80% relative humidity at 45° C. for six weeks and then foamed and cured as set forth above. Similarly, FIG. 13 is a photograph of three disks, 13A, 13B, and 13C used in the study made in accordance with formula B3. Again, disk 13A is an unexpanded "Control" disk. Disk 13B is a "Control" disk that was stored at room temperature for 6 weeks and then foamed and cured. Disk 13C was subjected to 80% relative humidity at 45° C. for six weeks and then foamed and cured as set forth above.

As can be seen in FIG. 12, disk 12C that was subjected to the heat and humidity for six weeks failed to expand much in the radially direction. In contrast, as shown in FIG. 13, disk 13C was well foamed and evenly formed after being subjected to heat and humidity. Again, the B3 disk's increased resistance to heat and humidity was unexpected.

Secant Modulus Testing

Finally, the secant modulus of formulas B2 and B3 were tested. Sample strips of B2 and B3 foamable material were made in accordance with process set forth with respect to the Accelerated Aging Testing. The secant modulus was then tested according to ASTM standards using an INSTRON® tensile testing apparatus for unexpanded sample strips and sample strips that had been expanded for 120 seconds at 200° C. The jaws of the INSTRON® tensile testing apparatus were set at 100 mm apart. The secant modulus data is set forth below in Table VIII.

TABLE VIII

| | 2% Secant Modulus (psi) | |
|---|---|---|
| Formula | Unexpanded | Expanded for 120 Seconds at 200° C. |
| B2 | 1709 | 195 |
| B3 | 1980 | 1601 |

The increased stability of the secant modulus for the B3 formula was unexpected.

While the present invention with its several embodiments has been described in detail, it should be understood that various modifications may be made to the present invention without departing from the scope of the invention. The following claims, including all equivalents define the scope of the invention.

What is claimed is:

1. A lamp assembly comprising:
   a base having a top and side walls forming a cavity with an interior surface;
   a glass lamp having at least one end with an exterior surface inserted in the base cavity; and
   a foamable coupling positioned between the interior surface of the base and the exterior surface of the glass lamp, said coupling comprising a copolymer selected from the group consisting of ethylene vinyl acetate, ethylene methyl acrylate, ethylene butyl acrylate, ethylene ethyl acrylate, ethylene methacrylic acid, and mixtures thereof, a blowing agent, a chemical crosslinking agent and a radiation crosslinking promoter;
   wherein when the base and glass lamp are heated, the foamable coupling expands and securely affixes the glass lamp in the base.

2. The lamp assembly of claim 1 wherein the coupling further comprises at least one tackifier, antioxidant, filler or a combination thereof.

3. The lamp assembly of claim 2 wherein the coupling comprises:
   from about 60 to 80 percent by weight of at least one copolymer wherein the copolymer is selected from the group consisting of ethylene vinyl acetate, ethylene methyl acrylate, ethylene butyl acrylate, ethylene ethyl acrylate, ethylene methacrylic acid, and mixtures thereof;
   from about 2 to 7 percent by weight of at least one chemical blowing agent;
   from about 3 to 15 percent by weight of at least one tackifier;
   from about 1 to 7 percent by weight of at least one peroxide;
   from about 0.5 to 5 percent by weight of at least one antioxidant;
   from about 1 to 4 percent by weight of at least one radiation crosslinking promoter; and
   from about 0 to 20 percent by weight of at least one filler.

4. The lamp assembly of claim 1 wherein the base and the glass lamp are heated to a temperature from 130–200° C.

5. The lamp assembly of claim 1 wherein the base and glass lamp are heated to a temperature from 150–180° C.

6. The lamp assembly of claim 1 wherein the base and glass lamp are heated to a temperature of 165° C.

7. The lamp assembly of claim 1 wherein the blowing agent is a microencapsulated blowing agent present in an amount from 1 to 10 percent by weight.

8. The lamp assembly of claim 7 wherein the base and glass lamp are heated to a temperature from 130–200° C.

9. The lamp assembly of claim 7 wherein the base is heated to a temperature of from about 150–190° C.

10. The lamp assembly of claim 7 wherein the base is heated to a temperature of 160° C.

11. The lamp assembly of claim 1 wherein the foamable coupling is ring-shaped, C-shaped, square-shaped, or rectangular-shaped.

12. The lamp assembly of claim 1 wherein when the base and glass lamp are heated the foamable coupling expands primarily in the radial direction.

13. A lamp assembly comprising:
   a base having a top and side walls forming a cavity with an interior surface;
   a glass lamp having at least one end with an exterior surface inserted in the base cavity; and
   a foamable coupling positioned between the interior surface of the base and the exterior surface of the glass lamp, said coupling comprising a non-pressure sensitive foamable composition comprising
      from about 50 to 80 percent by weight of at least one copolymer selected from the group consisting of ethylene vinyl acetate, ethylene methyl acrylate, ethylene butyl acrylate, ethylene ethyl acrylate, ethylene methacrylic acid, and mixtures thereof;
      from about 1 to 10 percent by weight of a microencapsulated blowing agent;
      from about 0 to 30 percent by weight of at least one tackifier;
      from about 0.5 to 5 percent by weight of at least one peroxide;
      from about 0 to 5 percent by weight of at least one chemical blowing agent;
      from about 1 to 10 percent by weight of a blowing agent activator;
      from about 0.25 to 5 percent by weight of at least one antioxidant;
      from about 0.5 to 5 percent by weight of at least one radiation crosslinking promoter; and
      from about 0 to 30 percent by weight of at least one filler
   wherein when the base and glass lamp are heated, the foamable coupling expands and securely affixes the glass lamp in the base.

14. A coupling for securely affixing one end of a light emitting glass lamp in a base, said coupling comprising a nonpressure sensitive adhesive foamable composition comprising:
   from about 50 to 80 percent by weight of at least one copolymer wherein the copolymer is selected from the group consisting of ethylene vinyl acetate, ethylene methyl acrylate, ethylene butyl acrylate, ethylene ethyl acrylate, ethylene methacrylic acid, and mixtures thereof;
   from about 1 to 10 percent by weight of a microencapsulated blowing agent;
   from about 0 to 30 percent by weight of at least one tackifier;
   from about 0.5 to 5 percent by weight of at least one peroxide;
   from about 0 to 5 percent by weight of at least one chemical blowing agent;
   from about 1 to 10 percent by weight of a blowing agent activator;
   from about 0.25 to 5 percent by weight of at least one antioxidant;
   from about 0.5 to 5 percent by weight of at least one radiation crosslinking promoter; and
   from about 0 to 30 percent by weight of at least one filler.

* * * * *